April 3, 1928.

A. VALLÉE Y GUMÁ

1,665,167

PROCESS FOR CLARIFYING LIQUIDS

Filed Nov. 7, 1921   3 Sheets-Sheet 1

Inventor
Antonio Vallée y Gumá
By B. Singer
Attorney

April 3, 1928.

A. VALLÉE Y GUMÁ

1,665,167

PROCESS FOR CLARIFYING LIQUIDS

Filed Nov. 7, 1921  3 Sheets-Sheet 3

Inventor
Antonio Vallée y Gumá

By B. Singer,
Attorney

Patented Apr. 3, 1928.

1,665,167

UNITED STATES PATENT OFFICE.

ANTONIO VALLÉE Y GUMÁ, OF HABANA, CUBA.

PROCESS FOR CLARIFYING LIQUIDS.

Application filed November 7, 1921, Serial No. 513,421, and in Cuba October 21, 1921.

This invention relates to processes for clarifying liquids, particularly the juices in the manufacture of sugar, and its main object is to provide an improvement in such processes of manufacture whereby the defecation and clarification of the sugar juices is effected through a sedimentation by surrounding the containers of the mass of sugar juices to be treated with a heating agent, maintaining the whole of said mass of sugar juice at an invariable temperature which is fixed at 100° C. or 212° F., as this is the temperature at which the sugar juice has a less specific density than that of the foreign bodies in suspension therein and whereby such bodies are compelled to settle in a few moments, thus aiding most efficiently the operation of clarifying the sugar juices and preparing the same for the further treatments in exceptional conditions of purity.

The common process at present in use for clarifying the sugar juices consists in liming the same with lime milk and heating them to a slow boiling point, withdrawing the same then from the heat and letting them stand to cause certain bodies to come to the surface and others to descend to the bottom of receipients called settling tanks, leaving an intermediate zone of clearer juice which is taken out by proper conduits. Or else the limed juice is heated to a high boiling, breaking the layers of foam on the surface and maintaining this high boiling point until the appearance of light foams on the surface. The heat is then withdrawn and the liquid is let to stand for the sedimentation of all the matters which were not dissolved, the clear juice remaining above the sediments and being taken out in any proper manner.

Obviously in the present processes the extent of the clarification will depend on the longer length of time employed to effect the same, and the objectionable features derived from the suspension of bodies whose density is about the same as that of the juice at very much lower temperatures than its boiling point can not be prevented, nor the dragging of sediments produced by the outlet flow of the liquid, thus requiring in either case a considerable length of time in the sedimentation. It is therefore, one of the objects of my invention to effect the sedimentation of the sugar juices maintaining a constant circulation in its mass, thus obviating the inconveniences derived from a stand still sedimentation.

It is a further object of the invention to effect the sedimentation of the sugar juices by means of a perfect sterilization of the same, guarding them from the ferments which destroy the saccharose, from the acidity, alcoholic fermentation, acetification and putrefaction.

It is still a further object of the invention to effect the sedimentation of the bodies in suspension in the mass of sugar juices, maintaining throughout the same an invariable temperature, the sedimentation being effected in a relatively much shorter length of time than that which is required in any of the processes at present in use, which I can say is about a tenth part of the time required in any of such present processes, and securing the immediate and thorough sedimentation of such matters at the temperature of 100° C. or 212° F.

It is still a further object of the invention to effect the sedimentation of the matters in suspension in the mass of sugar juices at a fixed and constant temperature substantially of 100° C. or 212° F. throughout the mass, thus preventing the formation of thermic currents owing to the instability of the temperatures throughout the various layers of liquids, and which thermic currents, owing to the molecular force exerted thereby overcome, annul and destroy the gravity action prevent sedimentation and cause agitation of the matters in suspension.

A further object of my invention is to cause the sugar juices to reach the vacuum evaporators at the same temperature they had at the settling devices with the result of boiling immediately when reaching the same, thus increasing the evaporating capacity of the same and shortening the time employed to reach the concentration of the syrups.

Another object of the invention is to produce residues without juice, which once diluted and boiled can be treated again by the same process, and the finally exhausted residues carried to the filter presses for drying.

A further object of the invention is to provide a process of clarification which can be applied to all matters in suspension contained in liquids whose boiling point is above 100° C., or 212° F.

It is an object of the invention to provide a process for obtaining the clarification of the sugar juices which is capable of being applied to the settling and clarifying static apparatus as well as to the centrifugal apparatus when it has been arranged to maintain such apparatus constantly at a temperature substantially of 100° C. or 212° F.

Other advantages and considerations relating to this invention will become evident to those skilled in the art in this specification with the aid of the annexed drawings, in which the same reference characters indicate similar parts throughout the various figures.

Figure 2:
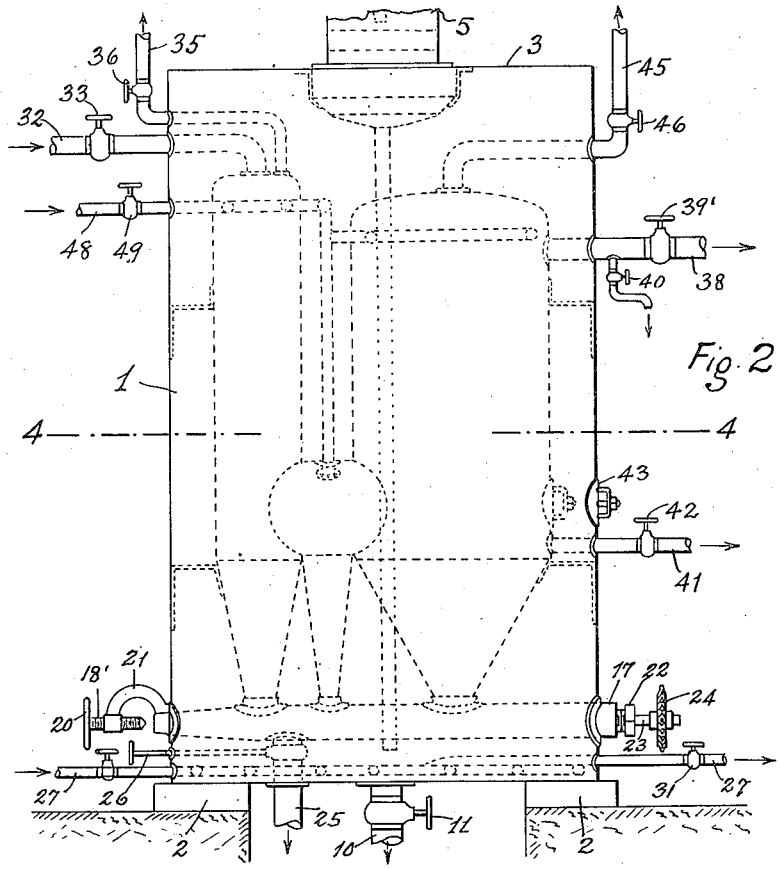
Fig. 2 is a side elevation thereof.
Figure 1:
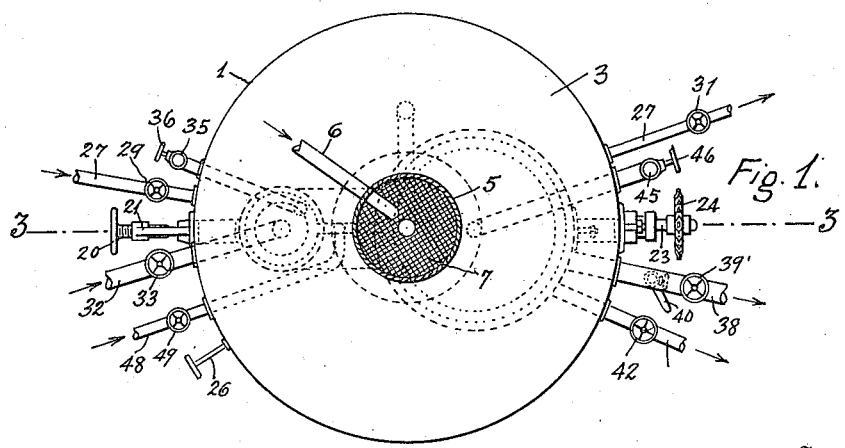
Fig. 1 is an upper plan view of the apparatus adapted to carry out the process forming the subject matter of this invention.
Figure 3:
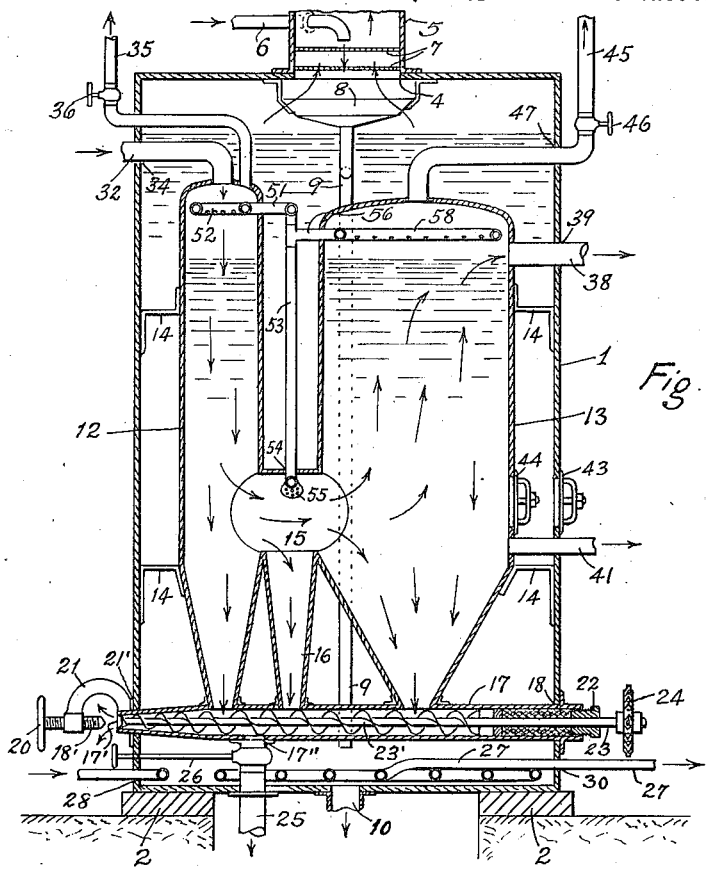
Fig. 3 is a vertical section on line 3—3 of Fig. 1.
Figure 4:
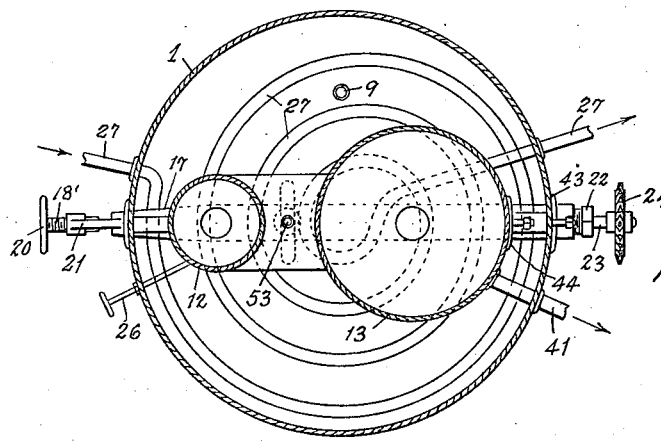
Fig. 4 is a horizontal section on line 4—4 of Fig. 2.

The process forming the subject matter of this invention consists in producing in a volume or mass of sugar juices the settling of the matters in suspension therein by uniformly maintaining throughout all the mass of sugar juices an invariable temperature which should be that at which the specific weight of the sugar juice is less than the specific weight of the suspension matters contained therein.

In making experiments I have observed that by filling with water a recipient or bottle of wide mouth and of proper capacity, boiling this water and maintaining the same boiling in the bottle at the atmospheric pressure, and taking separately another, smaller, bottle, tube, etc., containing limed sugar juice boiled until yellow foam appears on its surface, at a temperature of 110 or 115° C. or 235° to 250° F., the latter flask or bottle being tightly plugged, when the same is wholly introduced into the water in the first bottle in such a manner that the second flask does not touch the walls of the first one, after about one minute there will commence the formation of coagulums and thirty seconds thereafter the mass of flocculent matters in suspension will have settled on the bottom of the smaller flask, the sugar juice contained therein showing a through transparency. But if just only the upper part of the flask containing the sugar juice is taken out of the boiling water surrounding same, it will be observed that the cooling produces an instability in the temperature of the mass of the sugar juice which will cause sediments to ascend, against gravity and at a higher speed than that of the descending of the same and will circulate up and down and down and up, destroying and delaying the operation and causing the juice to lose its transparency. However, if it should be desired to stop the further obscuring of the juice, this could be done by simply reintroducing the flask containing the juice into that containing the boiling water, and the ascending movement of the suspension matters would stop and the settling thereof would again occur.

On this experience I have based my process which substantially consists in violently boiling the limed sugar juice so as to dislodge all the air and vapors contained therein, to a temperature of 110 to 115° C., or 235 to 250° F., at which time there will appear on its surface slight yellow foams then, decreasing the temperature to 100° C. or 212° F. and maintaining the volume of sugar juice for clarification at the latter temperature by surrounding same for that purpose with a proper heating agent, preferably a mass of water at the same temperature of 100° C. or 212° F., whereby to effect the settling of the matters in suspension described hereinbefore and in a length of time which can be estimated at from two minutes to four minutes, thus securing a circulation of clarified sugar juices which is perfect and continuous.

In the drawings is represented a proper apparatus for carrying out the clarifying process forming the subject matter of this invention. As illustrated in Figs. 1 to 4 inclusive said apparatus comprises an outer receptacle 1 which I shall call a "stabilizer", which in the present illustration is of cylindrical shape, but which can be of any other form which might be found convenient. Said receptacle rests on a proper base 2 and has a cover 3 at the center of which is an opening 4 and a collar or extension 5 for the purpose of conducting the water vapor and aid the condensation thereof, said collar is in lateral communication with a branch pipe 6 for the feeding of water into the receptacle 1. In the lower part of collar 5 are two or more special partitions 7 made of metallic web, with the object of aiding the cooling and condensation of the vapors, and below the opening 4 is a pan or collector 8 terminating at the side in horizontal flanges fixed to the inner face of the cover 3 around the opening 4, said pan having at its center a vertical tube 9 arranged to discharge into a discharge tube 10 of larger diameter located at the bottom of receptacle 1 and provided with stop cock 11.

Inside the "stabilizer" 1 are spaced vertical cylindrical receptacles 12 and 13 of different capacities, the first, which I call a settling receptacle of less capacity than the second, and for instance of a capacity four times less, than that of the said second receptacle with the object of reducing the speed of the liquid in its continuous circulation in the apparatus and both said receptacles in spaced relation to the wall of the receptacle or stabilizer 1 by means of angular arms 14, thus permitting the liquid in receptacle 1 to surround them. The settling receptacle 12 as well as the receptacle 13 which I call a "clarifier" terminate in open conical bottoms and communicate with one another immediately above said conical bottoms by a horizontal conduit 15 whose section is of larger area than that of the settling recipient 12 for the purpose of reducing the speed of circulation of the liquid below the speed of the settling of the matters in suspension contained therein. Said conduit 15 has a downwardly extending and contracting duct a conical extension 16 at its lower end, which, as well as the open ends of the conical bottoms of recipients 12 and 13 communicate, at the same level, with a tubular horizontal duct 17 diametrally arranged at the lower part of the receptacle 1 and with its ends extending through openings 18 and 19 in the wall of said receptacle 1. The discharge end portion of duct 17 which passes through an opening in the wall of the recipient 1, is slightly conical and projects somewhat beyond the said wall and has an outlet opening 17' of conical form with its narrow part toward the inside. 21 designates a supporting arm terminated at one end in a flange 21' fixed to the receptacle 1, its free end leading down and terminating at the same height of the outlet opening 17', and being provided with a horizontal threaded stem 18' having a handle 20. The end of this stem is conical and is adapted to fit gradually in the conical opening 17' of duct 17, this controlling the outlet of the material therethrough. In the open opposite end of the duct 17 is a gasket through which passes the shaft 23 of a helical screw 23' whose point terminates in front of the outlet opening 17' of duct 17. At the end of shaft 23 is a sprocket wheel 24 connected to a power generator not shown. Duct 17 has at its lower side an opening 17" and a tube 25 which has a valve controlled from the outside by a horizontal rod 26.

Below the tubular duct 17 is arranged a steam coil 27 which has its inlet through an opening 28 and has its outlet through an opening 30 in the opposite wall of the receptacle 1 and is provided with an inlet valve 29 and an outlet valve 31, this coil serving for the heating of the water in the receptacle 1. It is obvious that for such purpose I can use any other proper heating means without departing from the spirit of the invention.

To the upper part of the receptacle 12 is connected a branch tube 32 provided with a stop cock 33, which branch tube passes through an opening 34 at the upper part of the wall of the "stabilizer" receptacle and is connected to the devices for feeding the liquid to be clarified. There is also another tube branch 35 provided with a stop cock 36 and which passes through an opening in the wall of the "stabilizer." Said tube forms an outlet for air and vapors from the settling receptacle 12.

Through a side opening 39 at the upper part of the "clarifying" recipient 13 is connected a horizontal branch tube 38 having a stop cock 39' and a proof valve 40, said tube 38 serving to let out the clarified liquid in the "clarifying" receptacle. At the lower part of this receptacle immediately above the conical bottom thereof, is installed a horizontal branch tube 41, having a stop cock 42, which serves for the removal of liquids to be treated in the said receptacle. 43 and 44 designate man holes in the "stabilizer" 1 and the "clarifying" receptacle 13 respectively. 45 designates a pipe branch provided with a stop cock 46 and connected to the upper part of the "clarifying" receptacle and which passes through an opening 47 in the upper part of the receptacle 1, said pipe 45 serving to discharge the vapors and air in said "clarifier" 13. There is provided a cleansing system for the interior of the apparatus, by connecting a device for feeding water at pressure which is not shown, with a branch pipe 48 having a stop cock 49. Said branch pipe extends into the recipient 1 and is connected therein with a short branch 51 and with a downwardly leading pipe 52 from which leads a horizontal branch pipe 56. The branches 51 and 56 pass through side openings in the upper part of the receptacles 12 and 13 and are respectively connected in the same with sprinklers 52 and 58. The pipe 53 extends slightly into the upper part of conduit 15 and is connected therein with a sprinkler 55.

The "stabilizer" 1 should in practice be provided throughout all its exterior part with a proper insulating jacket made of any insulating material such as asbestos, magnesia, wood, etc.

The operation of this apparatus is as follows: Once water is fed to the "stabilizer" receptacle 1 through pipe 6 to the height indicated in Fig. 3, by previously closing the stop cock 11, steam is let into the coil 27 by opening the steam inlet valve 29, the stop cock 29' is closed and the plug 18' is fitted in the outlet opening 17' of the settlings extracting device; valve 36 of tube 35 and valve 46 of tube 45 are opened until the water in the recipient 1 reaches the temperature of boiling point at the atmospheric pressure, that is of 100° C. or 212° F. Once this has been attained the stop cock 33 of the tube 32 of inlet of boiled sugar juice to be clarified coming from proper boiling devices not shown and which temperature should have been previously reduced to 100° C. or 212°

F. is opened, as well as the proof valve 40, until clarified liquid appears there. The proof valve 40, the stop cock 36 of the escape tube 35 and the stop cock 46 of tube 45 are then closed. During this time the liquid to be clarified will have passed from the settling receptacle 12 through the conduit 15 to the clarifying receptacle 13 having been previously settled in the receptacle 12. The matter in suspension, as indicated by the arrows in Fig. 3, falls through the open bottom of the same into the duct 17 containing the screw 23'. There having by this time elapsed a period of about three minutes since the starting of the operation it will then be in order to withdraw gradually the plug 18', closing the outlet opening 17 of the settlings extracting device, provided that the settlings or residues appearing in said outlet have sufficient consistency and are not liquid. The screw 23' to which motion is transmitted through the sprocket wheel 24 and, which should have been started at the beginning of the operation, will force towards the outlet opening 17' of the duct 17 the settlings, compressing them, sufficiently, but without exhausting them as is obvious.

The settlings or residues which still remain in suspension in the sugar juice and which are carried with the same towards the clarifying recipient 13 through the conduit 15 will fall before reaching the upper part of the clarifier to the open end thereof and also to the open end of the extension 16 of conduit 15 into the duct 17.

The operation being thus started should continue without interruption, the clarified juice being continuously discharged through tube 38.

Whenever it may be desired to stop the operation of the apparatus, the stop cock 33 of the feeding tube 32 will be closed and after a reasonable length of time for the clarification of the liquid still contained in the receptacle 13 the exhaust valve 42 of tube 41 will be opened. When the liquid is exhausted the settlings in the duct 17 will be discharged through the pipe 25 by opening the valve therein by means of the rod 26.

Figure 6:
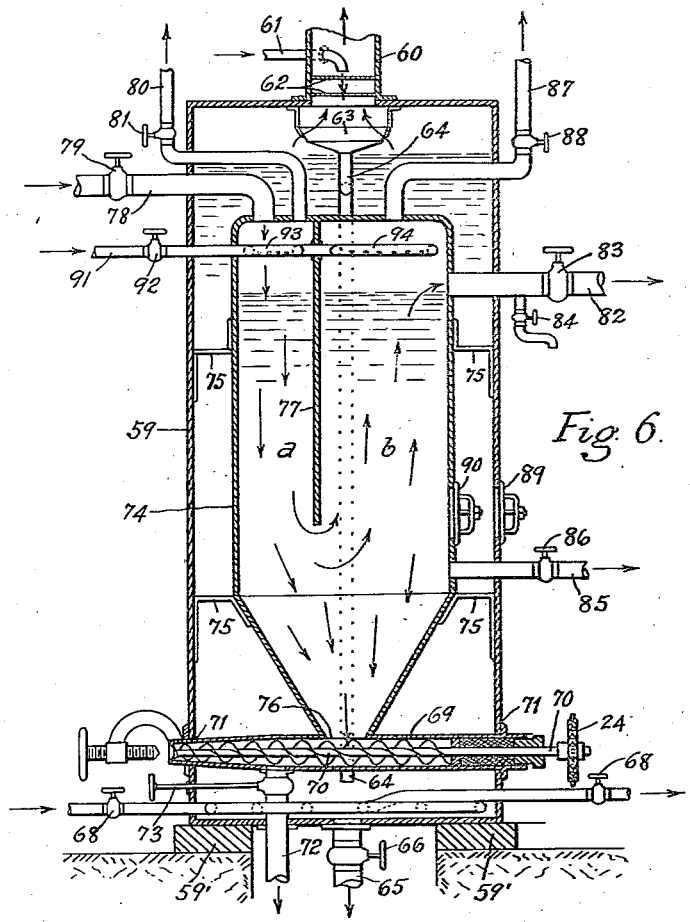
Fig. 6 is a vertical section on line 6—6 of Fig. 5.
Figure 5:
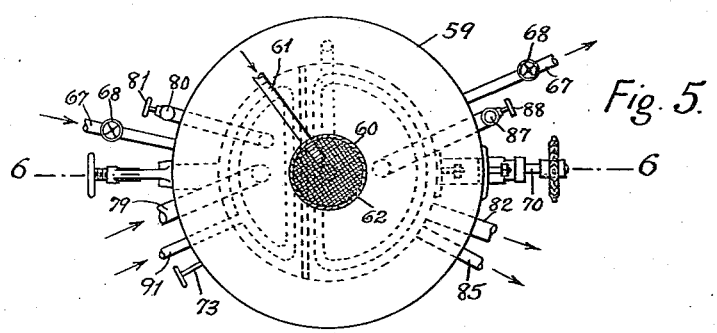
Fig. 5 is an upper plan view of a modified form of the apparatus.

In Figs. 5 and 6 of the drawings is illustrated a modified construction of the apparatus used for carrying out the process forming the subject matter of this invention and which apparatus which is substantially the same as the one hereinbefore described, requires a more economical installation and is more suitable for the clarification of liquids of diluted scums as these liquids are not so liable to alterations as the sugar juices are, and for which the hereinbefore described apparatus is more suitable as it is more easily cleansed. However, it is obvious that both constructions being the same, and the only difference consisting in the manner of separating the settling and clarifying receptacles, they can be used in general for all the cases of clarification of liquids.

Describing briefly this modified form for carrying out the process forming the subject matter of this invention I will state that the apparatus comprises a "stabilizer" receptacle 59 which is of cylindrical form in the present case and rests at its bottom on a proper base case 59' and provided at its cover with an opening with a collar or extension 60 in lateral communication with a water feeding tube 61 their being at the lower part of collar 60 horizontal partitions 62 of metallic web and below the lower opening thereof is fixed a condensation pan 63 having at its center an opening which is connected to a downwardly leading branch pipe 64 in alinement at its lower end with a discharge tube 65 having a stop cock 66 at the bottom of receptacle 59. In the wall of receptacle 59 near its bottom, are openings through which pass the inlet and outlet tubes of a steam coil 67 provided with inlet and outlet valves 68 and on the same is a tubular cover 69 for a settlings extracting device 70, mounted through opposite openings 71 in the walls of recipient 59 and which is of the same construction as that of the other form of apparatus hereinbefore described, the cover of said device being in communication with a discharge tube 72 having a control valve actuated from the exterior by a rod with handle 73.

Inside the "stabilizer" 59 is a receptacle 74 of less capacity maintained in spaced relation with the wall of the former by means of supporting arms 75 so as to permit the water in the receptacle 59 to entirely surround the same. Receptacle 74 has an open conical bottom united at its narrow part with an opening 76 in the upper part of the tubular duct 69 of the settlings extracting device. Said 74 is divided at its upper part in two chamber $a$ and $b$ by means of a pending transverse partition 77 leading from the upper part of the receptacle 74 to about the beginning of the conical bottom thereof, and accordingly both chambers $a$ and $b$ are at their lower ends in communication with each other. Chamber $a$ is of less capacity than chamber $b$ and are a settling chamber and clarification chamber respectively. With the settling chamber $a$ there is connected a tube 78 having a stop cock 79, and a tube for the escape of air and vapor 80 with its stop cock 81, and with the upper part of the clarification chamber $b$ there is connected a horizontal discharge tube 82 having a stop cock 83 and test cock 84, and also a discharge tube 85 having a stop cock 86. To the top of said chamber $b$ is connected a vapor and air escape tube 87 having a stop cock 88. 89 and 90 man holes in the lower outer part of chamber $b$ and to the side of receptacle 59, respectively.

The cleansing is effected by means of water under pressure through tube 91, provided with a stop cock 92 which passes through the upper part of the receptacle 59 and is connected in the chambers *a* and *b* at the upper part of the same with sprinklers 92 and 94.

The "stabilizer" 59 as in the case hereinbefore described should be provided with a proper insulating cover or jacket. The operation of this apparatus can be easily understood by referring to the construction hereinbefore described, as they are both similar. Water being fed through tube 61 to the receptacle 59 until it reaches the same level as indicated in Fig. 6, the stop cocks 66 and 83 are then closed and the escape valves 81 and 88 opened, steam is let into the coil 67 by opening the inlet valve thereof 68 and once the water in receptacle 59 is boiling the stop cock 79 is opened, thus letting in sugar juice boiled to the temperature of 100° C. or 212° F. to the chamber *a* of recipient 59, the settling being effected herein and the settlings falling to the bottom of recipient 59, to the interior of the tubular duct 69 of the settlings extracting device. The outlet opening thereof should have been kept closed by its plug and in these conditions the plug will be gradually withdrawn until the residues appearing are free from liquids and have a sufficient consistency. The clarified liquid will circulate from chamber *a* below the partition 77 upward into the "clarifying" chamber *b* in the direction indicated by the arrows in Fig. 6, and by opening the test cock 84, the appearance therein of the clarified liquid will show that the escape cocks 81 and 88 and test 84 should be closed and that the outlet cock 83 of the sugar juices should be opened, continuing the clarifying operation without interruption. The operations of stopping and cleansing the apparatus are effected as hereinbefore described.

It is obvious that my process can be applied to the clarifying apparatus of the static type as well as to those actuated by centrifugal force, and also that changes may be made, within the scope of the appended claims.

What I claim is:—

1. A process for clarifying liquids which have been alcalinized and cleared of the air and vapors contained therein, which consists in subjecting a body of such liquids to the action of an external heating agent to maintain in the liquid the uniform temperature of 100 degrees C. or 212 degrees F. during the clarification and settling of the materials contained in suspension in the liquid mass.

2. In a process of clarifying liquids, the phase which consists in effecting the clarification and settling of the materials in suspension which exist in a volume of liquid alcalinized and from which air and vapors have been eliminated and which is located in a container, surrounding said container with a volume of water maintained at normal pressure with a temperature of 100 degrees C. or 212 degrees F. and uniformly maintaining said temperature of 100 degrees C. or 212 degrees F. in the mass to be treated within the container and in the mass of water surrounding the same during the clarification and sedimentation of the materials in suspension in the mass to be treated.

3. In a process of clarifying liquids which are alcalinized, the steps of conducting the liquids into a container surrounded by a heating agent uniformly maintaining said calorific agent and the liquid mass in the container at a temperature of 100 degrees C. or 212 degrees F. during the clarification and sedimentation of said liquids, venting the air and vapors from said liquids, extracting continuously the materials in suspension which settle in the lower part of the liquid mass, and imparting continuously movement to the clarified liquid in the upper portion of the liquid mass to be treated.

4. In a process for clarifying liquids which are alcalinized, and which liquids are located in a container, totally surrounding said container of the mass to be treated with a heating agent which uniformly maintains the temperature of 100 degrees C. or 212 degrees F. while the clarification and settling of the materials in suspension contained in the mass is going on, venting air and vapors from the mass, imparting continuous movement to the clarified mass in the upper part thereof, and extracting continuously the materials in suspension which have been settled to the bottom of the mass.

In witness whereof I affix my signature.

ANTONIO VALLÉE Y GUMÁ.